United States Patent
Yasutomi et al.

(10) Patent No.: US 10,803,357 B2
(45) Date of Patent: Oct. 13, 2020

(54) COMPUTER-READABLE RECORDING MEDIUM, TRAINING METHOD, AND OBJECT DETECTION DEVICE

(71) Applicant: FUJITSU LIMITED, Kawasaki-shi, Kanagawa (JP)

(72) Inventors: Suguru Yasutomi, Kawasaki (JP); Toshio Endoh, Yokohama (JP); Takashi Katoh, Yokohama (JP); Kento Uemura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 145 days.

(21) Appl. No.: 15/992,754

(22) Filed: May 30, 2018

(65) Prior Publication Data

US 2018/0349741 A1 Dec. 6, 2018

(30) Foreign Application Priority Data

May 31, 2017 (JP) ................................ 2017-108456

(51) Int. Cl.
*G06K 9/20* (2006.01)
*G06K 9/62* (2006.01)
(Continued)

(52) U.S. Cl.
CPC ....... *G06K 9/6259* (2013.01); *G06K 9/00369* (2013.01); *G06K 9/00825* (2013.01);
(Continued)

(58) Field of Classification Search
USPC .......................... 380/201–237; 382/155–275
See application file for complete search history.

(56) References Cited

U.S. PATENT DOCUMENTS

2007/0098254 A1  5/2007  Yang et al.
2007/0203863 A1* 8/2007  Gupta .................... G06N 20/00
                                                                706/20
(Continued)

FOREIGN PATENT DOCUMENTS

JP    2009-514110    4/2009
JP    2010-257140    11/2010
(Continued)

OTHER PUBLICATIONS

Girshick, Ross, Microsoft Research, "Fast R-CNN," 2015 IEEE International Conference on Computer Vision (ICVV), IEEE, Dec. 7, 2015, XP032866491, pp. 1440-1448.
(Continued)

*Primary Examiner* — Marcellus J Augustin
(74) *Attorney, Agent, or Firm* — Staas & Halsey LLP

(57) ABSTRACT

An object detection device extracts feature for input data utilizing an encoder, the input data including labeled data and unlabeled data and detects object in each of the input data, utilizing an object detector. The object detection device generates region data for each of the input data, each of the region data corresponding to the detected object and generates restoration data from the region data and meta-information related to the detected object for each of the input data utilizing a decoder corresponding to the encoder. The object detection device executes learning of the encoder and the object detector based on a result detected by the object detector and a label associated with the input data, when the input data is labeled data. The object detection device executes learning of the encoder, the object detector, and the decoder, based on the input data and the restoration data.

7 Claims, 13 Drawing Sheets

(51) Int. Cl.
  *G06K 9/00*    (2006.01)
  *G06N 20/00*   (2019.01)
  *G06T 7/11*    (2017.01)
(52) U.S. Cl.
  CPC .......... *G06K 9/2054* (2013.01); *G06K 9/628* (2013.01); *G06N 20/00* (2019.01); *G06T 7/11* (2017.01)

(56) References Cited

U.S. PATENT DOCUMENTS

| | | |
|---|---|---|
| 2010/0272351 A1 | 10/2010 | Kato et al. |
| 2018/0144214 A1* | 5/2018 | Hsieh ................ G06K 9/6265 |
| 2018/0260793 A1* | 9/2018 | Li ....................... G06Q 10/20 |
| 2018/0285771 A1* | 10/2018 | Lee .................... G06N 20/00 |
| 2019/0197366 A1* | 6/2019 | Kecskemethy ...... G06K 9/6269 |

FOREIGN PATENT DOCUMENTS

| | | |
|---|---|---|
| JP | 2011-221840 | 11/2011 |
| WO | WO 2007/053470 A2 | 5/2007 |

OTHER PUBLICATIONS

Zhao, Junbo et al., "Stacked What-Where Auto-encoders," Feb. 14, 2016, XP05537287, URL: https://arxiv.org/pdf/1506.02351v8.pdf, pp. 1-12.

Zhang, Yuting et al., "Augmenting Supervised Neural Networks with Unsupervised Objectives for Large-scale Image Classification," arxiv.org, Cornell University Library, 201 Olin Library Cornell University Ithaca, NY 14853, Jun. 21 216, XP080709912, pp. 1-17.

Extended European Search Report, dated Oct. 18, 2018, in European Application No. 18175076.1 (7 pages).

* cited by examiner

FIG.6

| IMAGE | TYPE | x-COORDINATE | y-COORDINATE | WIDTH | HEIGHT |
|---|---|---|---|---|---|
| IMAGE A | PASSENGER VEHICLE | 48 | 110 | 33 | 19 |
|  | TRUCK | 5 | 45 | 43 | 30 |
|  | ... | ... | ... | ... | ... |
| ... | ... | ... | ... | ... | ... |

FIG.7

| IMAGE | WIDTH | HEIGHT |
|---|---|---|
| IMAGE A | XX | YY |
| ... | ... | ... |

FIG.8
| TYPE | x-COORDINATE | y-COORDINATE | WIDTH | HEIGHT |
|---|---|---|---|---|
| PASSENGER VEHICLE | 50 | 100 | 30 | 20 |
| TRUCK | 10 | 50 | 40 | 30 |
| ... | ... | ... | ... | ... |
FIG.9
| TYPE | x-COORDINATE | y-COORDINATE | WIDTH | HEIGHT |
|---|---|---|---|---|
| PASSENGER VEHICLE | 50 | 100 | 30 | 20 |
| TRUCK | 10 | 50 | 40 | 30 |
| ... | ... | ... | ... | ... |
+
META-INFORMATION OF IMAGE
(WIDTH, HEIGHT OF IMAGE)
⬇ ASSOCIATION WITH REGION IN IMAGE
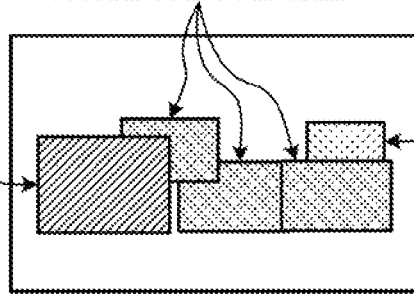
REGION CORRESPONDING TO PASSENGER VEHICLE
REGION CORRESPONDING TO TRUCK
REGION CORRESPONDING TO MOTORCYCLE

COMPUTER-READABLE RECORDING MEDIUM, TRAINING METHOD, AND OBJECT DETECTION DEVICE

CROSS-REFERENCE TO RELATED APPLICATION

This application is based upon and claims the benefit of priority of the prior Japanese Patent Application No. 2017-108456, filed on May 31, 2017, the entire contents of which are incorporated herein by reference.

FIELD

The embodiments discussed herein are related to a learning program, a learning method, and an object detection device.

BACKGROUND

An object detection technology of individually recognizing a plurality of objects existing in an input image, and detecting what comes in which part of the input image is utilized, and used for detection of vehicles, pedestrians, and the like for automated driving, character recognition, and the like. In the object detection technology, machine learning using supervised data is known, and performance is enhanced by deep learning.

In machine learning, over-training occurs when there is a small amount of supervised data, but creation of supervised data involves manpower cost. Thus, in recent years, there is known semi-supervised learning of enhancing generalization performance by using a small amount of supervised data and a large number of unsupervised data, and an autoencoder is known as semi-supervised learning of a class classification problem using deep learning.

The autoencoder includes a neural network (hereinafter, sometimes described as NN) that solves a normal class classification problem for an input, by executing supervised learning, and an NN that restores an input from an output of the NN by executing unsupervised learning.

In a detection device in which object detection is applied to an autoencoder that uses the semi-supervised learning, a feature extraction layer similar to a model suitable for a class classification problem is provided anterior to an NN for object detection, and semi-supervised learning using the autoencoder is applied to the feature extraction layer.

Specifically, the detection device includes an object detector and an autoencoder. In addition, the object detector includes a feature extraction NN that extracts features from an input image, and an object detection NN that outputs an object detection result from a feature output from the feature extraction NN, and executes deep learning of object detection. The autoencoder executes deep learning of image restoration using a restoration NN that restores an original image from a feature.

Patent Literature 1: Japanese National Publication of International Patent Application No. 2009-514110
Patent Literature 2: Japanese Laid-open Patent Publication No. 2010-257140
Patent Literature 3: Japanese Laid-open Patent Publication No. 2011-221840

Nevertheless, in the above-described detection device, over-training occurs as a whole, and generalization performance accordingly declines. For example, as for the feature extraction NN of the object detector in the detection device, learning is performed using both supervised data and unsupervised data. Thus, over-training can be suppressed. In contrast, as for the object detection NN, learning is performed using only supervised data. Over-training therefore occurs.

SUMMARY

According to an aspect of an embodiment, a non-transitory computer-readable recording medium stores therein a learning program that causes a computer to execute a process. The process includes extracting feature for input data utilizing an encoder, the input data including labeled data and unlabeled data; detecting object in each of the input data, utilizing an object detector; generating region data for each of the input data, each of the region data corresponding to the detected object; generating restoration data from the region data and meta-information related to the detected object for each of the input data utilizing a decoder corresponding to the encoder; executing learning of the encoder and the object detector based on a result of the detecting and a label associated with the input data, when the input data is labeled data; and executing learning of the encoder, the object detector, and the decoder, based on the input data and the restoration data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram illustrating an example of supervised data stored in a supervised data DB;
FIG. 7 is a diagram illustrating an example of information stored in a meta-information DB;
FIG. 8 is a diagram illustrating an example of an object detection result;
FIG. 9 is a diagram describing association of an object.

DESCRIPTION OF EMBODIMENTS

Preferred embodiments will be explained with reference to accompanying drawings. In addition, the invention is not limited by the embodiments. The embodiments can be appropriately combined without causing contradiction.

[a] First Embodiment

Description of Object Detection Device

An object detection device according to a first embodiment is an example of a computer device including a plurality of learning devices, and performs semi-supervised learning using an autoencoder, in a part of extracting a feature from an input image, in an object detection method using deep learning. At this time, even when there is a small amount of supervised data that involves high procurement cost, the object detection device realizes, by semi-supervised learning, object detection that is based on deep learning, and achieves high generalization performance by using unsupervised data.

Figure 1:
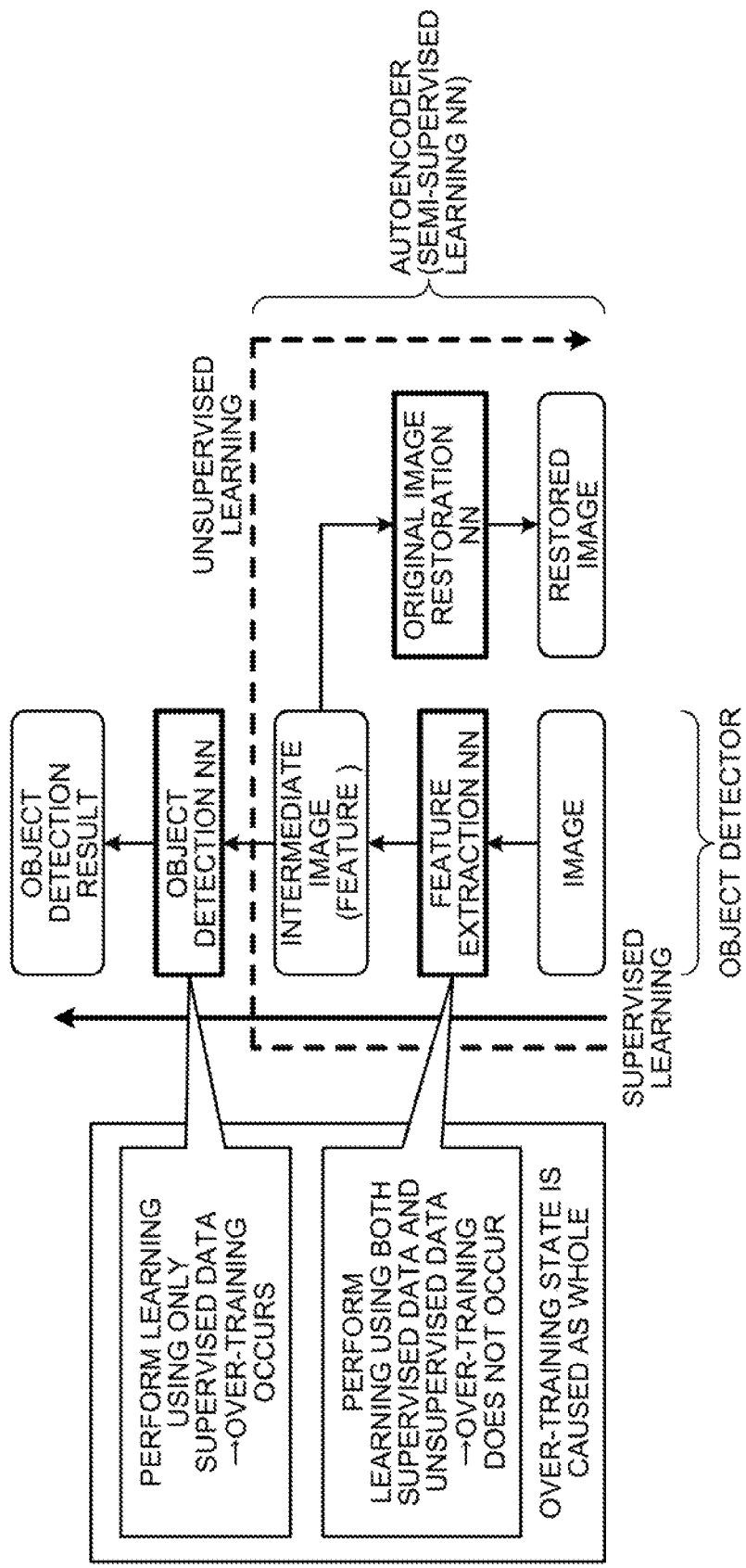
FIG. 1 is a diagram describing object detection to which semi-supervised learning is applied.

First, object detection to which general semi-supervised learning is applied will be described. FIG. 1 is a diagram describing object detection to which semi-supervised learning is applied. As illustrated in FIG. 1, a conventional object detection device includes an object detector that learns object detection of an input image (hereinafter, sometimes simply described as an original image), and an autoencoder that restores the input image. The object detector includes a feature extraction NN that extracts a feature from the input image, and an object detection NN that detects an object in the input image from the feature extracted by the feature extraction NN. In addition, the autoencoder includes an original image restoration NN that restores an original input image from the feature.

Here, the feature extraction NN performs learning using an error 1 which is a difference between the original image and a restored image restored by the original image restoration NN, and an error 2 which is an error between an object detection result obtained by the object detection NN, and known object information in the original image. In other words, because the feature extraction NN executes learning using unsupervised data for the error 1, and executes learning using supervised data for the error 2, over-training does not occur.

In addition, the object detection NN performs learning using the error 2 which is an error between the object detection result obtained by the object detection NN, and the known object information in the original image. In other words, because the object detection NN only performs learning using supervised data, over-training occurs. In addition, the original image restoration NN performs learning using the error 1 which is a difference between the original image and the restored image restored by the original image restoration NN. In other words, because the original image restoration NN only performs learning using unsupervised data, over-training does not occur.

In this manner, in the object detection to which general semi-supervised learning is applied that is illustrated in FIG. 1, an over-training state is caused as a whole. Thus, generalization performance that is obtained when object detection is performed by applying estimation target test data declines.

Figure 2:
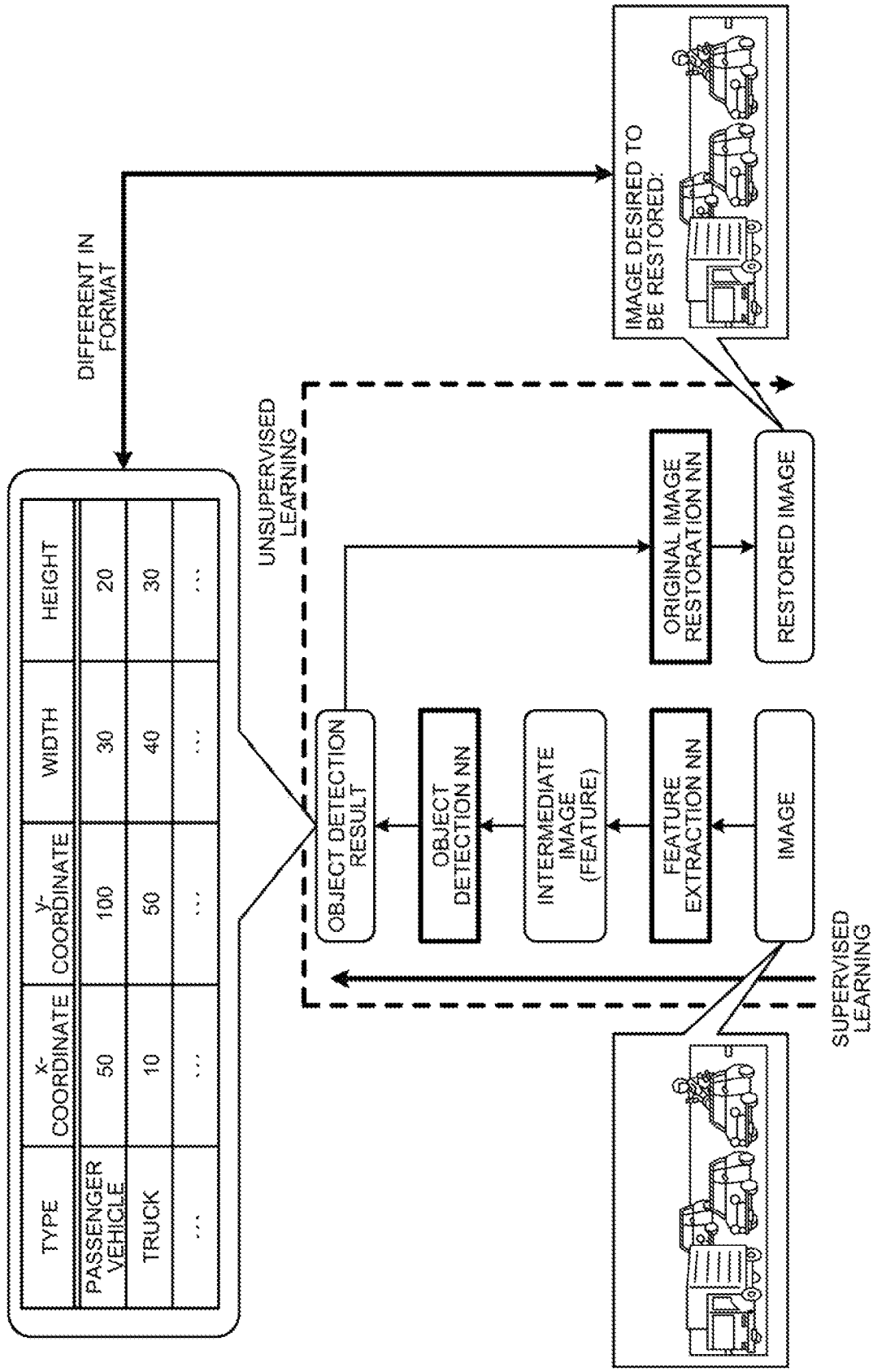
FIG. 2 is a diagram describing an example of extending an object detection method to semi-supervised learning.

For improving the over-training, a method of extending an object detection method to semi-supervised learning is considered. Specifically, using an object detection result as an input, an NN that restores an input image is formed. FIG. 2 is a diagram describing an example of extending an object detection method to semi-supervised learning. The object detection method illustrated in FIG. 2 has a configuration similar to FIG. 1, but differs in that the original image restoration NN restores an original image using an object detection result instead of a feature.

Here, similarly to FIG. 1, because the feature extraction NN executes learning using unsupervised data for the error 1, and executes learning using supervised data for the error 2, over-training does not occur. In addition, unlike FIG. 1, because the object detection NN executes learning using unsupervised data for the error 1, and executes learning using supervised data for the error 2, over-training does not occur. In addition, because the original image restoration NN only performs learning using unsupervised data for the error 1, over-training does not occur.

Nevertheless, in the method, because the object detection result and an image desired to be restored are largely different in format, it is impossible to restore the original input image in the original image restoration NN. Specifically, because the object detection result is a coordinate value of each object, and a restoration target is an image, it is difficult to perform image restoration by the original image restoration NN. As a result, it is impossible to execute semi-supervised learning as a whole.

Figure 3:
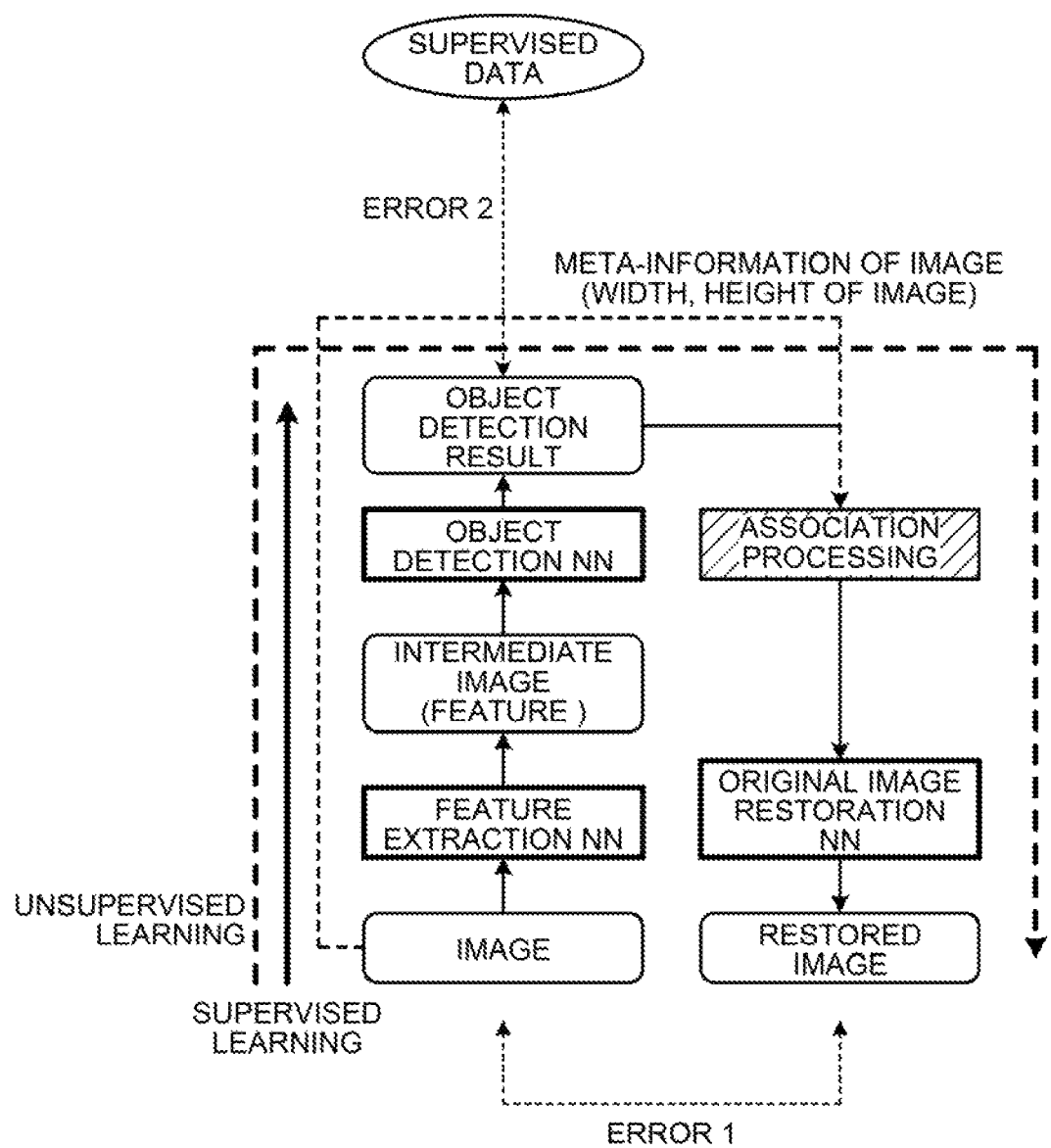
FIG. 3 is a diagram describing an object detection device according to a first embodiment.

Thus, in the first embodiment, an object detection device in which an object detection result is incorporated into an autoencoder by processing of associating an object detection result being a coordinate value, with a region in an input image is realized. FIG. 3 is a diagram describing an object detection device according to the first embodiment. Unlike FIG. 2, an object detection method illustrated in FIG. 3 executes processing of associating a coordinate value of an object detection result with a region in an input image. In other words, the object detection device according to the first embodiment associates an object detection result with a region in an input image, using meta-information such as width and height of the input image, and then, executes image restoration by the original image restoration NN using the associated result.

As a result, because the object detection device executes image restoration using an association result having a format close to an image, it becomes easier to execute restoration by the original image restoration NN, and semi-supervised learning can be executed. Thus, the object detection device can suppress occurrence of over-training, and enhance generalization performance.

Functional Configuration

Figure 4:
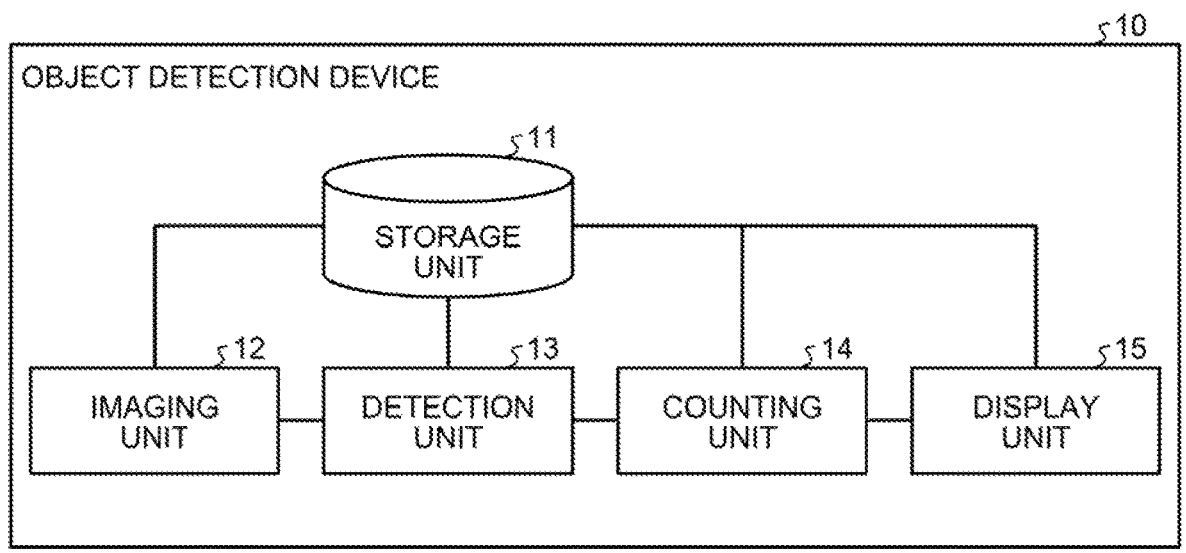
FIG. 4 is a diagram describing a functional configuration of the object detection device according to the first embodiment.

Next, a functional configuration of the object detection device according to the first embodiment will be described. FIG. 4 is a diagram describing a functional configuration of the object detection device according to the first embodiment. As illustrated in FIG. 4, an object detection device 10 includes a storage unit 11, an imaging unit 12, a detection unit 13, a counting unit 14, and a display unit 15. In addition, functions illustrated here are exemplifications, and for example, a communication processing unit that executes communication control can be included. In addition, the imaging unit 12, the detection unit 13, the counting unit 14, and the display unit 15 each serve as an example of an electronic circuit included in a processor, or an example of a process executed by the processor.

The storage unit 11 is an example of a storage device that stores programs and data, and is, for example, a memory, a hard disc, or the like. The imaging unit 12 is a processing unit that captures an image using a camera or the like, and captures an image of a road on which a vehicle travels, and the like, for example.

The detection unit 13 is a processing unit that learns object detection using training data, and detects an object from an image captured by the imaging unit 12. The counting unit 14 is a processing unit that counts results of object detection obtained by the detection unit 13. The display unit 15 is a processing unit that displays a count result obtained by the counting unit 14, on a display or the like.

Figure 5:
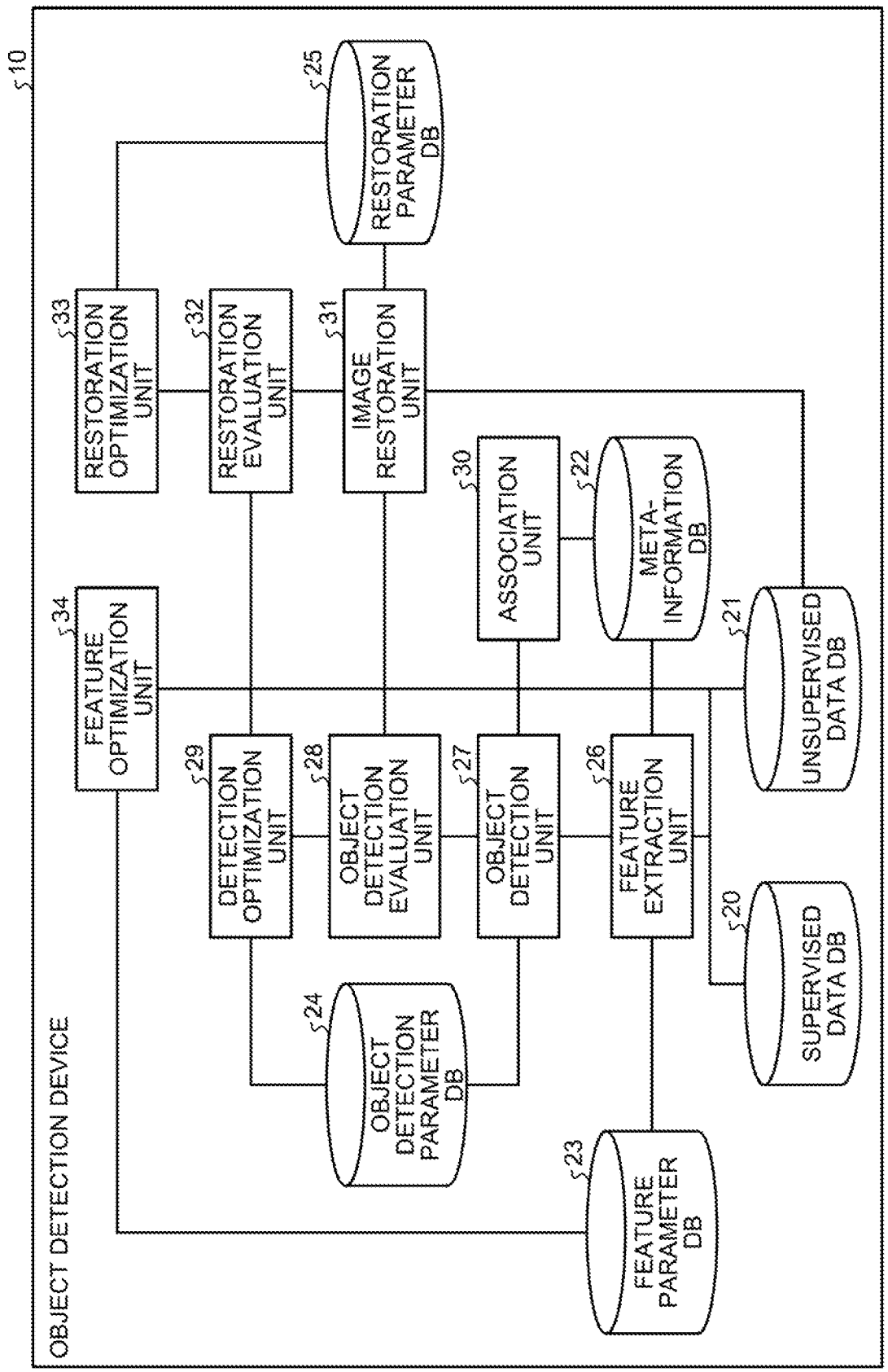
FIG. 5 is a functional block diagram illustrating a functional configuration of a detection unit of the object detection device according to the first embodiment.

Here, details of the detection unit 13 will be described. FIG. 5 is a functional block diagram illustrating a functional configuration of the detection unit 13 of the object detection device 10 according to the first embodiment. As illustrated in FIG. 5, the object detection device 10 includes a supervised data DB 20, an unsupervised data DB 21, a meta-information DB 22, a feature parameter DB 23, an object detection parameter DB 24, and a restoration parameter DB 25. The object detection device 10 includes a feature extraction unit 26, an object detection unit 27, an object detection evaluation unit 28, a detection optimization unit 29, an association unit 30, an image restoration unit 31, a restoration evaluation unit 32, a restoration optimization unit 33, and a feature optimization unit 34. In addition, each DB is a database stored in the storage unit 11.

In addition, each processing unit serves as an example of an electronic circuit included in a processor, or an example of a process executed by the processor. In addition, the feature parameter DB 23, the feature extraction unit 26, and the feature optimization unit 34 serve as an example of the feature extraction NN, and serve as an example of an encoder. The object detection parameter DB 24, the object detection unit 27, the object detection evaluation unit 28, and the detection optimization unit 29 serve as an example of the object detection NN, and serve as an example of an object detector. In addition, the restoration parameter DB 25, the image restoration unit 31, the restoration evaluation unit 32, and the restoration optimization unit 33 serve as an example of the original image restoration NN, and serve as an example of an encoder. In addition, as each NN, an NN including a convolution layer, a pooling layer, and a fully connected layer can be used.

The supervised data DB 20 is a database that stores supervised training data. Specifically, the supervised data DB 20 stores supervised data in which an input target image and object information related to an object included in the image are associated. FIG. 6 is a diagram illustrating an example of supervised data stored in the supervised data DB 20.

As illustrated in FIG. 6, the supervised data DB 20 stores "image, type, x-coordinate, y-coordinate, width, and height" in association with each other. The "image" is information for identifying an input image, and may be an image itself or information indicating a storage location of an image. The "type" is information related to class classification of an object included in the input image. The "x-coordinate" is an x-coordinate corresponding to the center of an object, and the "y-coordinate" is a y-coordinate of the center of the object. The "width" is a width of the object, and the "height" is a height of the object. In the example of FIG. 6, it is indicated that a passenger vehicle with a width 33 and a height 19 that is centered on (x, y)=(48, 110) is included in an image A. In addition, units of width and height can be arbitrarily set, and can be set to a number of pixels, or the like, for example.

The unsupervised data DB 21 is a database that stores unsupervised training data. Specifically, the unsupervised data DB 21 stores an input target image.

The meta-information DB 22 is a database that stores meta-information being additional information of each input image. FIG. 7 is a diagram illustrating an example of information stored in the meta-information DB 22. As illustrated in FIG. 7, the meta-information DB 22 stores "image, width, and height" in association with each other. The "image" stored here is information for identifying an input image, the "width" is information indicating a width of the input image, and the "height" is information indicating a height of the input image. In the example of FIG. 7, it is indicated that the image A has a size corresponding to a width "XX" cm and a height "YY" cm.

The feature parameter DB 23 is a database that stores various parameters applied to the feature extraction NN. In other words, the feature parameter DB 23 stores parameters of a neural network used for extraction of a feature. Parameters stored here are learned by the feature optimization unit 34, and used by the feature extraction unit 26.

The object detection parameter DB 24 is a database that stores various parameters applied to the object detection NN. In other words, the object detection parameter DB 24 stores parameters of a neural network used for object detection. Parameters stored here are learned by the detection optimization unit 29, and used by the object detection unit 27.

The restoration parameter DB 25 is a database that stores various parameters applied to the original image restoration NN. In other words, the restoration parameter DB 25 stores parameters of a neural network used for image restoration. Parameters stored here are learned by the restoration optimization unit 33, and used by the image restoration unit 31.

The feature extraction unit 26 is a processing unit that executes an NN to which parameters stored in the feature parameter DB 23 are applied, and extracts a feature from an input image. Specifically, the feature extraction unit 26 reads an input image of supervised data or an input image of unsupervised data from each DB, and extracts edge, contrast, and the like in the image from the input image as a feature. Then, the feature extraction unit 26 outputs the extracted feature to the object detection unit 27. At this time, the feature extraction unit 26 also outputs information indicating whether the read training data is supervised data. In addition, at the time of object detection after learning, the feature extraction unit 26 reads an input image being estimation target test data, and extracts a feature.

The object detection unit 27 is a processing unit that executes an NN to which parameters stored in the object detection parameter DB 24 are applied, and detects an object from a feature. For example, the object detection unit 27 extracts position information of each object included in the input image, from the feature extracted by the feature extraction unit 26, and detects each object. FIG. 8 is a diagram illustrating an example of an object detection result. As illustrated in FIG. 8, an object detection result is information in which "type, x-coordinate, y-coordinate, width, and height" are associated. The "type" is information indicating a type of an object, the "x-coordinate" is an x-coordinate corresponding to the center of the object, and the "y-coordinate" is a y-coordinate of the center of the object. The "width" is a width of the object, and the "height" is a height of the object.

In the example of FIG. 8, it is indicated that a passenger vehicle with a width 33 and a height 20 that is centered on (x, y)=(50, 100) is detected, and a truck with a width 40 and a height 30 that is centered on (x, y)=(10, 50) is detected. In addition, by pre-registering a size (width and height) of each type, a type can be identified from the detected width and height. Then, the object detection unit 27 outputs the object detection result illustrated in FIG. 8, to the object detection evaluation unit 28 and the association unit 30. At this time, the object detection unit 27 also outputs information indicating whether it is supervised data notified from the feature extraction unit 26.

The object detection evaluation unit 28 is a processing unit that evaluates an object detection result obtained by the object detection unit 27. For example, when training data is supervised data, the object detection evaluation unit 28 acquires object information corresponding to the input image, from the supervised data DB 20. Then, the object detection evaluation unit 28 compares known object information being supervised data, and a detection result estimated by the object detection unit 27. For example, the object detection evaluation unit 28 calculates the above-described error 2 based on a degree of coincidence and a degree of similarity, and outputs the error 2 to the detection optimization unit 29 and the feature optimization unit 34. In addition, known various methods can be employed for calculation of a degree of coincidence and a degree of similarity.

The detection optimization unit 29 is a processing unit that optimizes various parameters of the object detection parameter DB 24. Specifically, when training data is supervised data, the detection optimization unit 29 updates parameters of the object detection NN such that the error 2 input from the object detection evaluation unit 28 and the error 1 to be described later become small. On the other hand, when training data is unsupervised data, the detection optimization unit 29 updates parameters of the object detection NN such that the error 1 to be described later becomes small. In other words, each time a feature is extracted from training data, the detection optimization unit 29 optimizes parameters by performing learning such that the error 2 becomes small by supervised learning, and performing learning such that the error 1 becomes small by unsupervised learning.

The association unit 30 is a processing unit that associates a coordinate value of an object detection result with a region in an image. Specifically, if the association unit 30 receives an object detection result obtained by the object detection unit 27, the association unit 30 acquires meta-information corresponding to training data used in the object detection, from the meta-information DB 22, and associates a detected object with a region in an image, using the meta-information and the object detection result. Then, the association unit 30 outputs the association result to the image restoration unit 31.

FIG. 9 is a diagram describing association of an object. As illustrated in FIG. 9, the association unit 30 identifies a total image of the image using meta-information of the image. Subsequently, the association unit 30 sets a left corner of the total image of the image as an origin, a horizontal direction as an x-axis, and a vertical direction as a y-axis. After that, the association unit 30 identifies, from the total image of the image, a region with a width 33 and a height 20 that is centered on the x-coordinate (50) and the y-coordinate (100) of the object detection result, and associates a region corresponding to a passenger vehicle. Similarly, the association unit 30 identifies, from the total image of the image, a region with a width 40 and a height 30 that is centered on the x-coordinate (10) and the y-coordinate (50) of the object detection result, and associates a region corresponding to a truck. In this manner, the association unit 30 associates the object detection result with the image.

In addition, as another method, association using a probability map can be performed. Specifically, the association unit 30 calculates a probability map indicating where each object exists, using a differentiable distribution such as gauss distribution. In addition, by representing in a differentiable form, incorporation into back propagation used in learning of an NN becomes possible.

Figure 10:
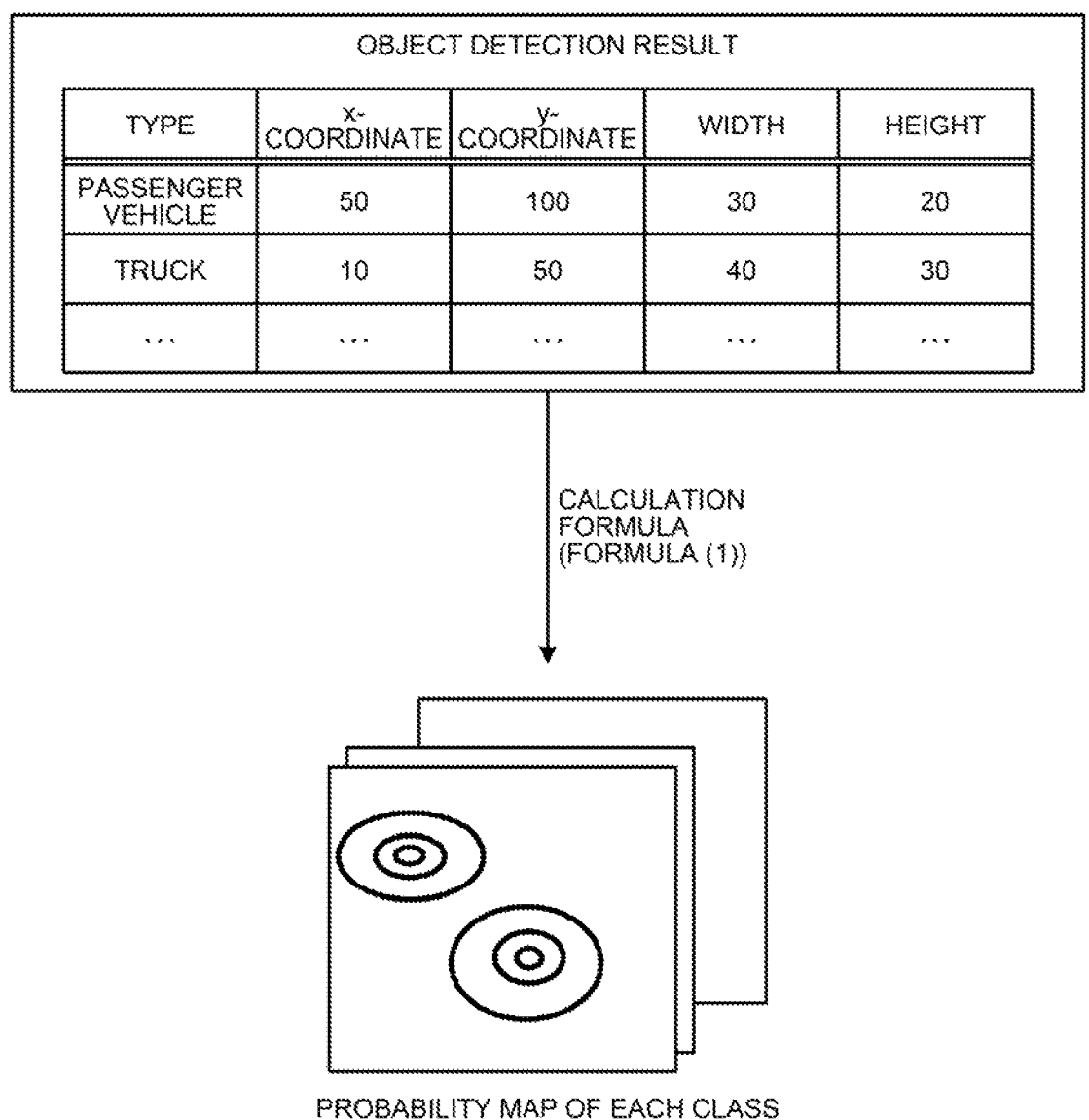
FIG. 10 is a diagram describing association of an object using a probability map.

FIG. 10 is a diagram describing association of an object using a probability map. As illustrated in FIG. 10, the association unit 30 substitutes an object detection result into Formula (1), and calculates a probability map of each class. In other words, for the total image of the image identified using the meta-information of the image, the association unit 30 obtains in which part of the image each class (type) comes. Here, $P_c(i,j)$ in Formula (1) denotes a probability map of a class c, K denotes the number of object detections of a certain object detection result, and $P(C_k=c)$ denotes a probability at which a kth object candidate is the class c. q denotes a differentiable distribution, such as gauss distribution, x, y, w, and h denote coordinate values of the object, and they respectively indicate x-coordinate, y-coordinate, width, and height. Thus, $P(C_k=c)$ and K, (x,y,w,h) can be acquired from the object detection result, and the other values are preset.

$$P_c(i, j) = \frac{1}{K}\sum_{k=1}^{K} P(C_k = c)q(i, j | x, y, w, h) \quad (1)$$

The image restoration unit 31 is a processing unit that executes an NN to which parameters stored in the restoration parameter DB 25 are applied, and restores an image from the association result. Specifically, the image restoration unit 31 restores the image from the association result using a method similar to a known autoencoder, and outputs the image to the restoration evaluation unit 32. In addition, known various methods can be employed as a restoration method.

The restoration evaluation unit 32 is a processing unit that evaluates a restoration result obtained by the image restoration unit 31. Specifically, the restoration evaluation unit 32 compares the restoration result obtained by the image restoration unit 31, and the input image, and evaluates a degree of restoration. For example, the restoration evaluation unit 32 calculates the above-described error 1 using a degree of similarity and a degree of coincidence between the restoration result and the input image, and outputs the error 1 to the restoration optimization unit 33, the detection optimization unit 29, and the feature optimization unit 34.

The restoration optimization unit 33 is a processing unit that optimizes various parameters of the restoration parameter DB 25. Specifically, the restoration optimization unit 33 updates various parameters of the restoration parameter DB 25 such that the error 1 input from the restoration evaluation unit 32 becomes small. In other words, each time a feature is extracted from training data, the restoration optimization unit 33 optimizes parameters by performing learning such that the error 1 becomes small by unsupervised learning.

The feature optimization unit 34 is a processing unit that optimizes various parameters of the feature parameter DB 23. Specifically, when training data is supervised data, the feature optimization unit 34 updates various parameters of the feature parameter DB 23 such that the error 1 input from the restoration evaluation unit 32, and the error 2 input from the object detection evaluation unit 28 become small. In addition, when training data is unsupervised data, the feature optimization unit 34 updates various parameters of the feature parameter DB 23 such that the error 1 input from the restoration evaluation unit 32 becomes small. In other words, each time a feature is extracted from training data, the feature optimization unit 34 optimizes parameters by performing learning such that the error 2 becomes small by supervised learning, and performing learning such that the error 1 becomes small by unsupervised learning.

Flow of Processing

Figure 11:
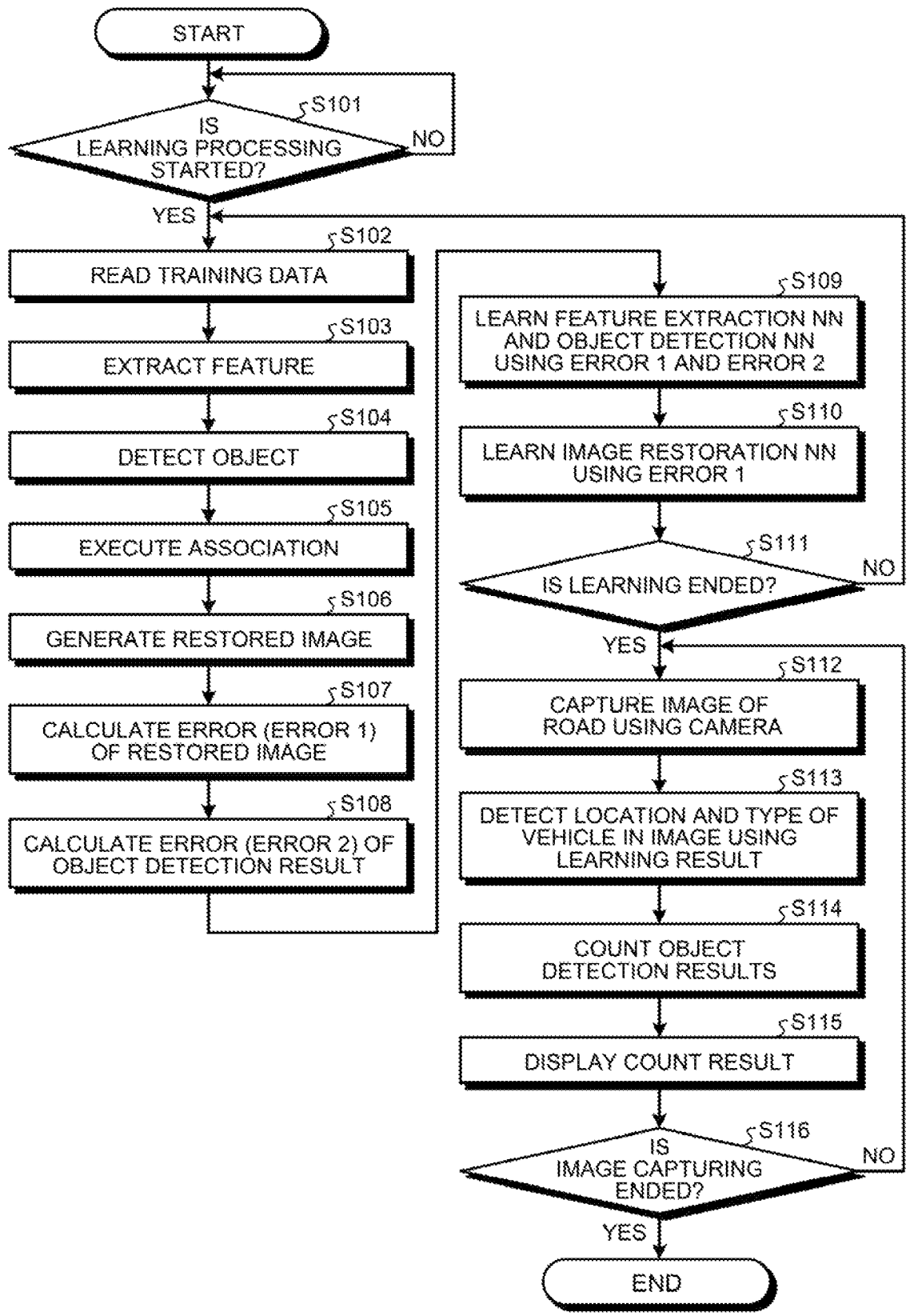
FIG. 11 is a flowchart illustrating a flow of processing.

FIG. 11 is a flowchart illustrating a flow of processing. As illustrated in FIG. 11, when learning processing is started (S101: Yes), the feature extraction unit 26 reads training data (S102), and extracts a feature (S103).

Subsequently, the object detection unit 27 detects an object from the feature (S104), and the association unit 30 executes association from the object detection result and meta-information (S105). Then, the image restoration unit 31 restores an original input image using the association result (S106).

After that, the restoration evaluation unit 32 calculates the error 1 which is a difference between the input image and the restored image (S107), and the object detection evaluation unit 28 calculates the error 2 which is a difference between object information of the input image and the detection result (S108). In addition, the error 2 is calculated when training data is supervised data. In addition, the order of the calculation of the error 1 and the calculation of the error 2 is not limited to a particular order.

Then, using the error 1 and the error 2, the detection optimization unit 29 learns parameters of the NN such that each error becomes small, and using the error 1 and the error 2, the feature optimization unit 34 learns parameters of the NN such that each error becomes small (S109). In addition, using the error 1, the restoration optimization unit 33 learns parameters of the NN such that the error 1 becomes small (S110). In addition, the order of learnings is not limited to a particular order.

Then, when learning is continued (S111: No), processes subsequent to S102 are repeated for the next training data. On the other hand, when learning is ended (S111: Yes), the object detection device 10 captures an image of a road using a camera (S112).

Subsequently, the object detection device 10 executes extraction of a feature, object detection, and the like using a learning result, and detects a location and a type of a vehicle in the captured image (S113). Then, the object detection device 10 counts object detection results (S114), and displays a count result (S115). Then, when image capturing is continued (S116: No), the object detection device 10 repeats processes subsequent to S112, and when image capturing is ended (S116: Yes), processing is ended.

In addition, in FIG. 11, an example of sequentially executing learning processing and actual detection processing has been described. Nevertheless, the processing is not limited to this, and learning processing and actual detection processing can be executed at separate timings.

Effect

The object detection device 10 according to the first embodiment can perform object detection by semi-supervised learning using deep learning while suppressing over-training using training data. In addition, by the introduction of semi-supervised learning, the object detection device 10 can form an object detector with high generalization performance by using a small amount of supervised data and a large number of unsupervised data. As a result, the object detection device 10 can suppress a decline in generalization performance that is caused by over-training.

In addition, because the object detection device 10 can form an object detector with high generalization performance, a system that calculates and displays a degree of congestion of each lane and a breakout of vehicle types by capturing an image of a road using a camera, and detecting vehicles in the captured image and types thereof can be realized. For example, the object detection device 10 can detect a degree of congestion of each lane, running vehicles, and the like in such a manner that a degree of congestion of a lane 1 is 90%, truck 33%, and passenger vehicle 66%.

[b] Second Embodiment

Division of Detection Result

Figure 12:
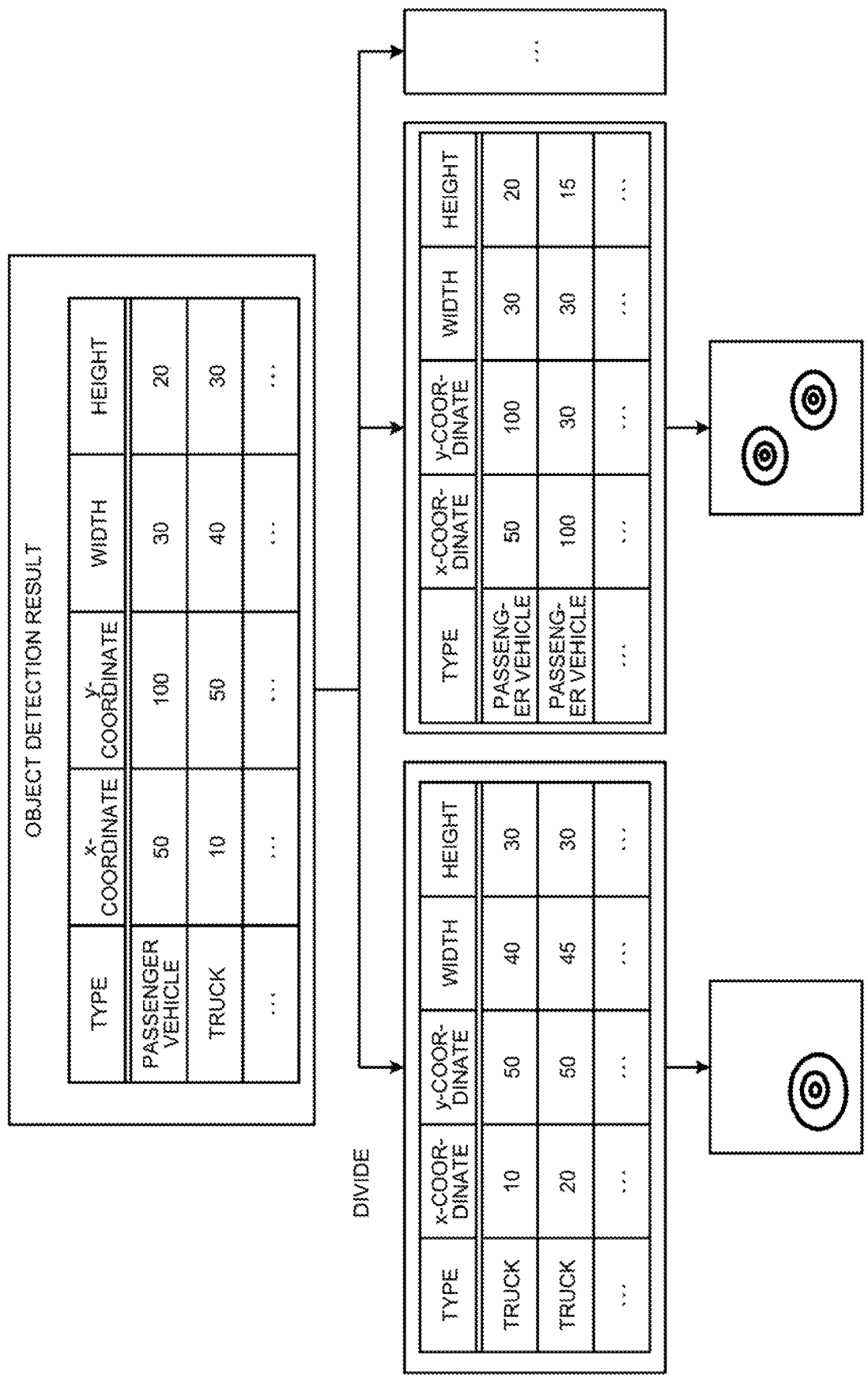
FIG. 12 is a diagram describing an example of dividing and associating a detection result.

In the above-described first embodiment, an example of performing association based on the probability map directly using the object detection result has been described. Nevertheless, association is not limited to this. For example, the association unit 30 can perform association after dividing an object detection result. FIG. 12 is a diagram describing an example of dividing and associating a detection result. As illustrated in FIG. 12, the association unit 30 classifies an object detection result by type, generates a probability map for each classified type, and executes association.

In addition, as a classification method, for detected objects, an object detection result can be divided according to a size such as a width, a height, and an area, and a class of the object such as a passenger vehicle and a truck, and a probability map can be individually created.

For example, when a detection target is a passenger vehicle, a truck, or the like, features do not vary between classes, but features vary in size in an image, a method of dividing by size of the object is effective. In addition, when an image of a document is captured, and characters are detected, sizes of the characters are all similar, and if characters are different, features largely vary. Thus, it is effective to divide by class of the object (characters in this example). A threshold of division can be predetermined from an amount of statistics of training data. In addition, association processing can be executed each time one piece of training data is read, or association processing can be executed collectively for a plurality of training data.

Image Restoration

Figure 13:
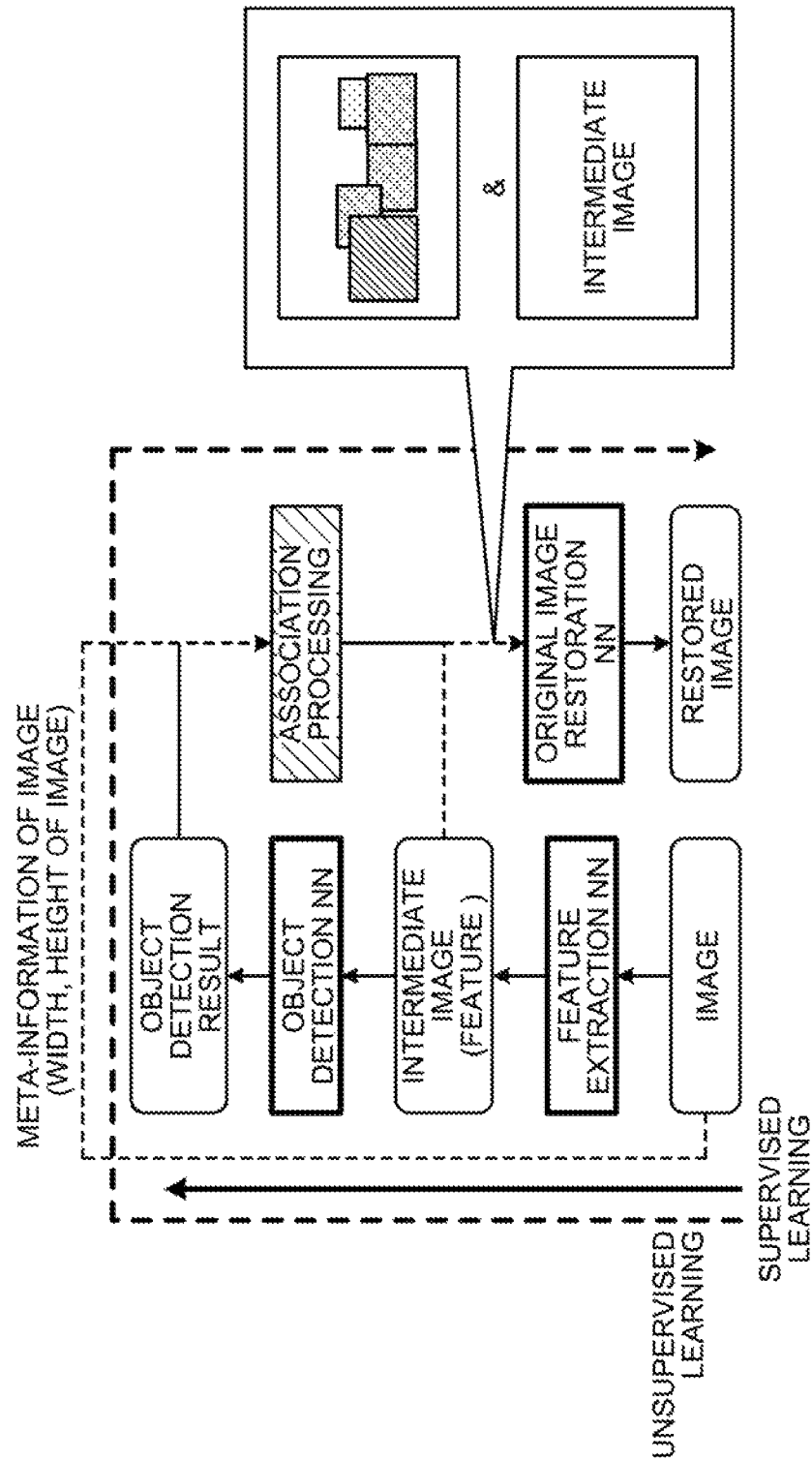
FIG. 13 is a diagram describing image restoration using a feature.

In the above-described first embodiment, the description has been given of an example in which the image restoration unit 31 restores the original input image using an association result and meta-information. Nevertheless, restoration is not limited to this. For example, the image restoration unit 31 may further add a feature, and restore an original input image. FIG. 13 is a diagram describing image restoration using a feature. As illustrated in FIG. 13, the image restoration unit 31 inputs meta-information, an association result obtained by association processing, and a feature extracted by the feature extraction NN, to the original image restoration NN, and generates a restored image.

For example, when objects having the same class but largely different in appearance are included in data, by adding an intermediate image (feature) to the input of the original image restoration NN for helping restoration of an original image, accuracy of the restored image can be enhanced. For example, when vehicles and humans are detected, it is considered that vehicles and humans having various appearances exist. In this case, only with information indicating that "a vehicle exists hear" or "a human exists hear", information (what type of vehicle or what type of human exists) for restoring an original image is insufficient. It is therefore effective to use an intermediate image.

Restoration of Intermediate Image

Figure 14:
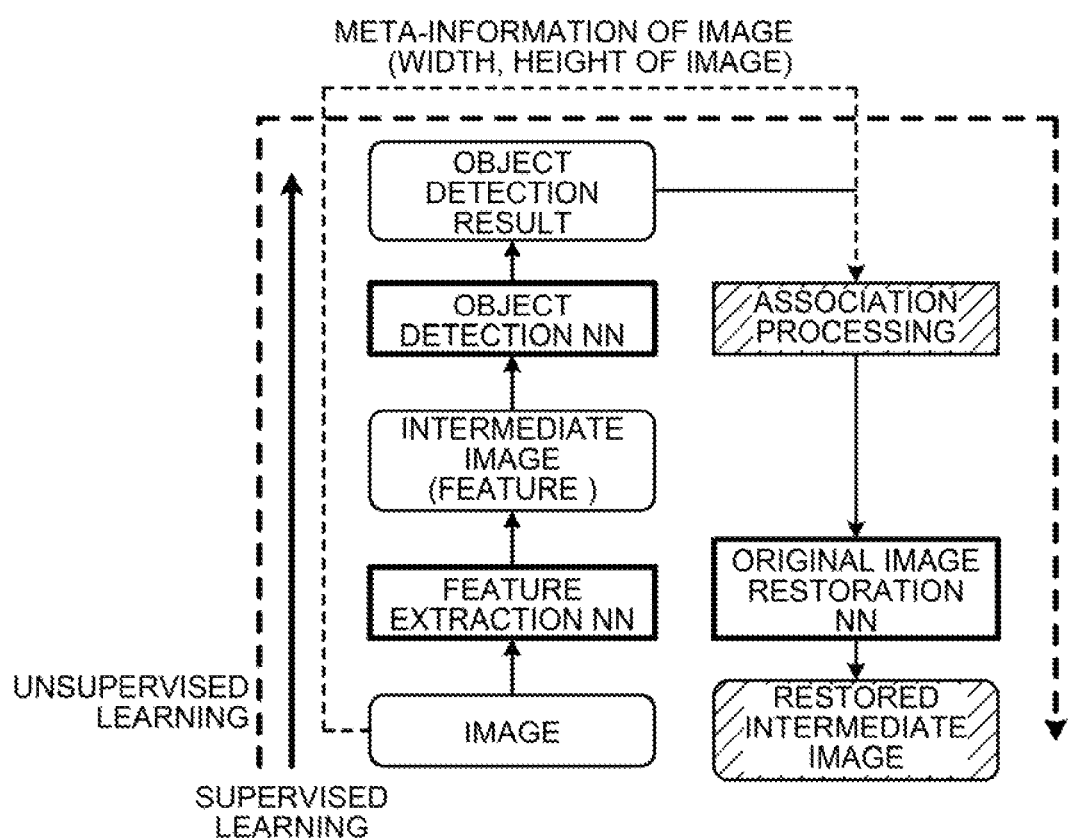
FIG. 14 is a diagram describing an example of restoring an intermediate image.

In the above-described first embodiment, an example of restoring an original input image has been described. Nevertheless, restoration is not limited to this, and an intermediate image can be restored. FIG. 14 is a diagram describing an example of restoring an intermediate image. As illustrated in FIG. 14, by changing parameters and configurations of the original image restoration NN, the image restoration unit 31 changes a restoration target from an input image to an intermediate image. Then, the image restoration unit 31 restores the intermediate image using an association result and meta-information.

For example, when only images of a fixed single camera become inputs, the inputs are not various, but when images captured by various cameras become inputs, more various images become inputs. In this case, the original image restoration NN needs to restore various images, but in some cases, representational power becomes insufficient. In other words, when input images are various, it is considered that restoration of input images becomes difficult. In this case, by restoring an intermediate image or an intermediate output of the feature extraction NN that is formed of information with a higher level of abstraction than an input image, instead of the input, by the original image restoration NN, accuracy of the restored image can be enhanced. In addition, methods illustrated in FIGS. 12 to 14 can be combined.

[c] Third Embodiment

The embodiments of the present invention have been described so far. The present invention may be implemented in various different forms aside from the above-described embodiments. Thus, a different embodiment will be described below.

Learning Device

In the above-described embodiments, the description has been given of an example of executing learning by back propagation using an NN in each learning device. Nevertheless, a learning method is not limited to this. For example, other learning methods such as a gradient method can also be employed.

Processing Target

In the above-described embodiments, the description has been given using an image of a lane or the like, as an example. Nevertheless, the processing target is not limited to this. For example, characters or an image including characters may be used as a processing target. In this case, detection and restoration of characters are executed as the above-described object.

System

Processing procedures, control procedures, specific names, and information including various types of data and parameters that have been illustrated in the above-described document and the drawings can be arbitrarily changed unless especially specified. In addition, the feature extraction unit 26 serves as an example of an extraction unit, the object detection unit 27 serves as an example of a detection unit, the association unit 30 and the image restoration unit 31 serve as an example of a restoration unit, the detection optimization unit 29 and the feature optimization unit 34 serve as an example of a first learning unit, and the detection optimization unit 29, the feature optimization unit 34, and the restoration optimization unit 33 serve as an example of a second learning unit.

In addition, each component of each device illustrated in the drawings is intended to conceptually indicate functions, and needs not be always physically formed as illustrated in the drawings. In other words, a specific form of separation and integration of devices is not limited to that illustrated in the drawings. In other words, all or part of the devices can be formed by functionally or physically separating or integrating at an arbitrary unit, according to various loads, usage situations, and the like. Furthermore, all or any part of processing functions performed in each device are realized by a CPU and a program analyzed and executed by the CPU, or can be realized as hardware using wired logic.

Hardware Configuration

Figure 15:
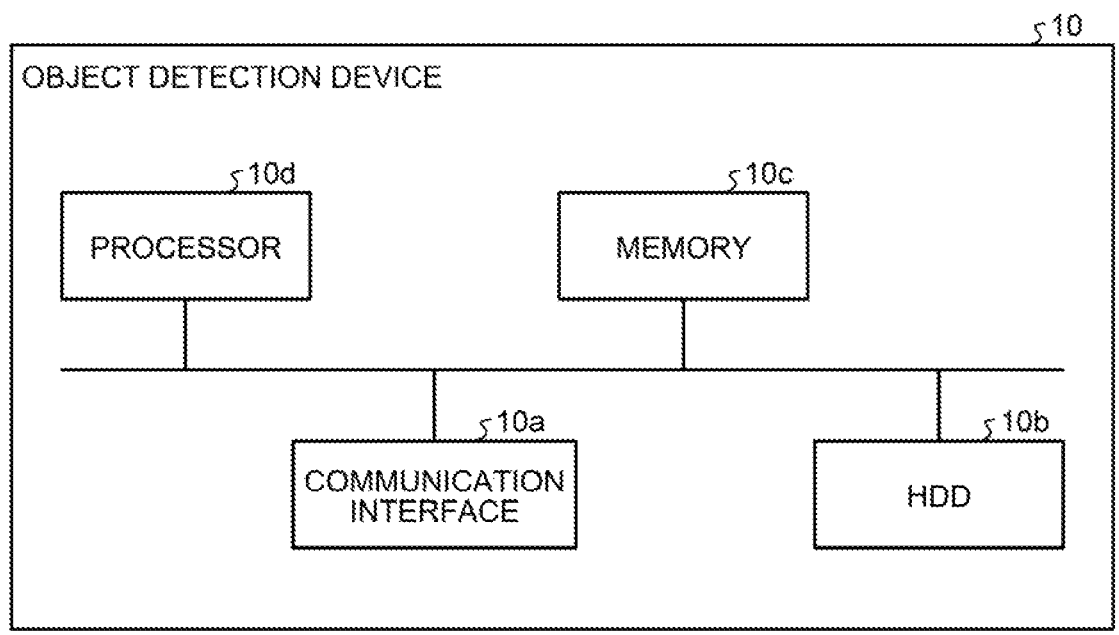
FIG. 15 is a diagram describing a hardware configuration example.

FIG. 15 is a diagram describing a hardware configuration example. As illustrated in FIG. 15, the object detection device 10 includes a communication interface 10a, a hard disk drive (HDD) 10b, a memory 10c, and a processor 10d.

The communication interface 10a is a network interface card or the like that controls communication of other devices. The HDD 10b is an example of a storage device that stores programs, data, and the like.

Example of the memory 10c include a random access memory (RAM) such as a synchronous dynamic random access memory (SDRAM), a read only memory (ROM), a flash memory, and the like. Examples of the processor 10d include a central processing unit (CPU), a digital signal processor (DSP), a Field Programmable Gate Array (FPGA), a programmable logic device (PLD), and the like.

In addition, the object detection device 10 operates as an information processing device that executes an object detection method by reading and executing a program. In other words, the object detection device 10 executes programs that execute functions similar to the feature extraction unit 26, the object detection unit 27, the object detection evaluation unit 28, the detection optimization unit 29, the association unit 30, the image restoration unit 31, the restoration evaluation unit 32, the restoration optimization unit 33, and the feature optimization unit 34. As a result, the object detection device 10 can execute processes of executing functions similar to the feature extraction unit 26, the object detection unit 27, the object detection evaluation unit 28, the detection optimization unit 29, the association unit 30, the image restoration unit 31, the restoration evaluation unit 32, the restoration optimization unit 33, and the feature optimization unit 34. In addition, execution of programs referred to in the other embodiments is not limited to execution by the object detection device 10. For example, the present invention can be similarly applied to a case in which another computer or a server executes a program, or a case in which these execute the program in cooperation with each other.

The program can be delivered via a network such as the internet. In addition, the program is recorded on a computer-readable recording medium such as a hard disk, a flexible disk (FD), a CD-ROM, a Magneto-Optical disk (MO), and a Digital Versatile Disc (DVD), and can be executed by being read from the recording medium by a computer.

According to the embodiments, a decline in generalization performance that is caused by over-training can be suppressed.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a training program that causes a computer to execute a process comprising:
   acquiring first data output from an encoder in response to inputting second data including labeled data and unlabeled data into the encoder;
   acquiring third data output from an object detector in response to inputting the first data into the object detector, the third data indicating an object included in the second data;
   generating fourth data based on the third data and meta-information indicating size of the second data;
   acquiring fifth data output from a decoder in response to inputting the fourth data into the decoder;
   executing training of the encoder and the object detector, based on a difference between the third data and a label associated with the labeled data in a machine learning technique, the label relating to the object; and
   executing training of the encoder, the object detector, and the decoder, based on a difference between the second data and the fifth data in the machine learning technique.

2. The non-transitory computer-readable recording medium according to claim 1, wherein the generating includes generating a total image of the second data using the meta-information, generating a probability map that estimates a region where the object exists in the total image, and generating the fourth data that associates position information of the object with the total image of the second data using the probability map.

3. The non-transitory computer-readable recording medium according to claim 2, wherein the generating includes generating each probability map for a plurality of objects included in the second data, and generating the fourth data that associates each position information of the plurality of objects with the total image of the second data using the each probability map.

4. A training method comprising:
   acquiring first data output from an encoder in response to inputting second data including labeled data and unlabeled data into the encoder, using a processor;
   acquiring third data output from an object detector in response to inputting the first data into the object detector, the third data indicating an object included in the second data, using the processor;
   generating fourth data based on the third data and meta-information indicating size of the second data;
   acquiring fifth data output from a decoder in response to inputting the fourth data into the decoder, using the processor;
   executing training of the encoder and the object detector, based on a difference between the third data and a label associated with the labeled data in a machine learning technique, the label relating to the object, using the processor; and
   executing training of the encoder, the object detector, and the decoder, based on a difference between the second data and the fifth data in the machine learning technique, using the processor.

5. The training method according to claim 4, wherein the generating includes generating a total image of the second data using the meta-information, generating a probability map that estimates a region where the object exists in the total image, and generating the fourth data that associates position information of the object with the total image of the second data using the probability map.

6. The training method according to claim 5, wherein
   the generating includes generating each probability map for a plurality of objects included in the second data, and generating the fourth data that associates each position information of the plurality of objects with the total image of the second data using the each probability map.

7. An object detection device comprising:
   a processor configured to:
   acquire first data output from an encoder in response to inputting second data including labeled data and unlabeled data into the encoder;
   acquire third data output from an object detector in response to inputting the first data into the object detector, the third data indicating an object included in the second data;
   generate fourth data based on the third data and meta-information indicating size of the second data;
   acquire fifth data output from a decoder in response to inputting the fourth data into the decoder;
   execute training of the encoder and the object detector, based on a difference between the third data and a label associated with the labeled data in a machine learning technique, the label relating to the object; and
   execute training of the encoder, the object detector, and the decoder, based on a difference between the second data and the fifth data in the machine learning technique.

* * * * *